Patented Dec. 21, 1937

2,102,621

UNITED STATES PATENT OFFICE 2,102,621

ACCELERATOR OF VULCANIZATION

Robert C. Goodwin, Lubbock, Tex., and Arthur W. Sloan, Akron, Ohio; said Sloan assignor to The B. F. Goodrich Company, New York, N. Y., a corporation of New York No Drawing. Application April 11, 1936, Serial No. 73,969

16 Claims. (Cl. 18—53)

This invention relates to the art of rubber manufacture and has as its chief object to provide a new and improved class of accelerators of vulcanization. This application is a continuation in part of our copending application Serial No. 704,292 filed December 28, 1933.

Derivatives of dithiocarbamic acids were among the first known organic accelerators of vulcanization. The salts of dialkyl dithiocarbamic acids are very readily prepared by the simple reaction of carbon disulphide with the appropriate dialkyl amine, but have never been widely used because of their high cost, relative instability, and their extreme activity at the temperatures at which rubber is ordinarily processed, which results in a pronounced tendency to prevulcanization. Similar derivatives of mono-aryl and alkyl-aryl dithiocarbamic acids have been proposed as accelerators, but they too are somewhat unstable and exhibit no marked advantages over other more readily prepared accelerators, hence have not been widely used.

In the process of this invention the vulcanization of rubber is accelerated by diaryl dithiocarbamates of bivalent metals. For example, the salts of diphenyl dithiocarbamic acid or the similar ditolyl (ortho, meta, para or mixed), di-naphthyl (alpha, beta or mixed), phenyl-naphthyl (alpha, beta or mixed), phenyl-cumyl or other like diaryl substituted dithiocarbamic acids with magnesium, zinc, cadmium, lead, tin (stannous), or other like bivalent metals are all excellent accelerators of vulcanization. The properties of these salts, in which the metal is combined solely with diaryl substituted dithiocarbamic acids, differ markedly from those of salts of aliphatic substituted acids, and in particular are practically free from any tendency to prevulcanize rubber or cause "scorching" although they bring about a rapid vulcanization at ordinary vulcanizing temperatures. The individual members of this class vary in activity over a considerable range, the lead salts generally being rather slow accelerators and the zinc salts quite rapid, although the order of activity of the various salts of the different acids is not always the same. Thus the zinc salt of phenyl beta-naphthyl dithiocarbamic acid is a stronger accelerator than the lead salt, whereas the reverse is true of the salts of phenyl alpha-naphthyl dithiocarbamic acid. These salts cannot be prepared directly from carbon disulphide and the diarylamine, as can the aliphatic compounds, but are readily prepared by first replacing the hydrogen of the diarylamine by an alkali metal, then adding carbon disulphide to form the alkali dithiocarbamate, and finally converting it to the desired bivalent metal salt by double decomposition with a soluble salt of the desired metal.

As a specific example of one embodiment of the method of this invention, a rubber composition is prepared by mixing 100 parts by weight of rubber, 5 parts of zinc oxide, 1 part of stearic acid, 3 parts of sulphur and 0.5 part of zinc diphenyl-dithiocarbamate. The mixture is vulcanized by heating for 20 minutes at 275° F. in a press. The product is strong and well vulcanized. Somewhat better results are obtained by adding a nitrogenous base to activate the accelerator. For example, when 0.3 part of zinc diphenyl-dithiocarbamate are used as accelerator in the above composition along with 0.2 part of polybutylidene-aniline as an activator, the mixture when vulcanized under the same conditions is considerably stronger and stiffer.

It is to be understood that the specific example given above is merely illustrative of one manner of use of the accelerators of this invention, that other accelerators within the scope of the class herein defined may be substituted for the specific compound used in the example, and that the accelerators of this invention may be used in admixture with each other or other known accelerators, or with age-resistors, organic acids, amines, softeners, pigments, fillers, etc. and that the rubber may be vulcanized with the assistance of this new class of accelerators in other manners than that particularly set forth above; specifically, it may be vulcanized in hot air, steam, hot water, etc. The term aryl as herein employed refers to univalent aromatic hydrocarbon radicals whose free valence belongs to the nucleus and not to a side chain.

The scope of this invention is accordingly not to be limited to the specific examples herein set forth, but is to be limited only as required by the prior art and as indicated in the appended claims.

We claim:

1. The process which comprises vulcanizing rubber in the presence of a salt consisting of a bivalent metal combined solely with diaryl dithiocarbamic acids.

2. The process which comprises vulcanizing rubber in the presence of a salt consisting of zinc combined solely with diaryl dithiocarbamic acids.

3. The process which comprises vulcanizing rubber in the presence of zinc diphenyl-dithiocarbamate.

4. The process which comprises vulcanizing rubber in the presence of a salt consisting of a bivalent metal combined solely with a phenyl naphthyl dithiocarbamic acid.

5. The process which comprises vulcanizing rubber in the presence of zinc phenyl beta-naphthyl dithiocarbamate.

6. The process which comprises vulcanizing rubber in the presence of a salt consisting of lead combined solely with diaryl dithiocarbamic acids.

7. The process which comprises vulcanizing rubber in the presence of lead phenyl alpha-naphthyl dithiocarbamate.

8. The process which comprises heating a mixture of rubber, sulphur, and a salt consisting of a bivalent metal combined solely with diaryl dithiocarbamic acids.

9. The process which comprises heating a mixture of rubber, sulphur, a nitrogenous base, and a salt consisting of a bivalent metal combined solely with diaryl dithiocarbamic acids.

10. The process which comprises heating a mixture of rubber, sulphur, a nitrogenous base, and a salt consisting of zinc combined solely with diaryl dithiocarbamic acids.

11. A rubber composition which has been vulcanized in the presence of a salt consisting of a bivalent metal combined solely with diaryl dithiocarbamic acids.

12. A rubber composition which has been vulcanized in the presence of a salt consisting of zinc combined solely with diaryl dithiocarbamic acids.

13. A rubber composition which has been vulcanized in the presence of zinc diphenyl-dithiocarbamate.

14. A rubber composition which has been vulcanized in the presence of a salt consisting of a bivalent metal combined solely with a phenyl naphthyl dithiocarbamic acid.

15. A rubber composition which has been vulcanized in the presence of zinc phenyl beta-naphthyl dithiocarbamate.

16. A rubber composition which has been vulcanized in the presence of lead phenyl alpha-naphthyl dithiocarbamate.

ROBERT C. GOODWIN.
ARTHUR W. SLOAN.